United States Patent [19]

Raszkowski

[11] Patent Number: 5,531,303
[45] Date of Patent: Jul. 2, 1996

[54] TORQUE MECHANISM FOR A POWER TRANSMISSION

[75] Inventor: James A. Raszkowski, Indianapolis, Ind.

[73] Assignee: General Motors Corporation, Detroit, Mich.

[21] Appl. No.: 340,970

[22] Filed: Nov. 17, 1994

[51] Int. Cl.$^6$ .................. B60K 41/26; B60T 1/06; G05G 5/18
[52] U.S. Cl. .................. 192/4 A; 74/411.5; 188/31
[58] Field of Search ............ 192/4 A; 74/411.5, 74/577 S; 188/31, 69

[56] References Cited

U.S. PATENT DOCUMENTS

| | | |
|---|---|---|
| 3,187,846 | 6/1965 | Powell .................. 188/69 |
| 3,213,968 | 10/1965 | Platz .................. 188/69 |
| 3,300,001 | 1/1967 | Stockton .................. 192/4 A |
| 3,703,941 | 11/1972 | Ohie et al. .................. 192/4 A X |
| 4,369,867 | 1/1983 | Lemieux .................. 192/4 A |
| 5,170,869 | 12/1992 | Svab et al. .................. 192/4 A |
| 5,269,195 | 12/1993 | Kitagaware .................. 74/411.5 |

*Primary Examiner*—Rodney H. Bonck
*Attorney, Agent, or Firm*—Donald F. Scherer

[57] ABSTRACT

A parking pawl is pivotally mounted on a transmission housing for selective engagement with a park gear which is rotatable with a transmission output shaft disposed along a longitudinal axis in the transmission housing. The pawl is moved into engagement with the park gear by an axial face cam which is disposed for rotation on an axis supported transversely of the transmission housing.

2 Claims, 3 Drawing Sheets

5,531,303

1

TORQUE MECHANISM FOR A POWER TRANSMISSION

TECHNICAL FIELD

This invention relates to power transmissions, and more particularly, to park gear mechanisms for power transmissions.

BACKGROUND OF THE INVENTION

From engine-rear drive power trains with automatic shifting transmissions typically have a park mechanism wherein a "bullet-nose" cam is urged between a reaction wall and a pivotable pawl when the park maneuver is undertaken by the operator. The cam is controlled in axial movement by a linkage connected with the manual selector lever of the transmission.

One such system is shown in Mrlik et al. U.S. Pat. No. 2,875,856 issued Mar. 3, 1959. While systems such as these are very effective, the forces to disengage the cam from between the wall and the pawl can be high when the vehicle is parked on a grade. If systems such as these are used in trucks having a high gross vehicle weight (GVW), the pull-out force can become extremely high, such that considerable effort would be required by the operator when shifting from "Park" to "Drive".

SUMMARY OF THE INVENTION

An axial face cam and roller on the park pawl cooperate to establish low pull-out forces in the park mechanism. The face cam has a large roller bearing supporting the thrust forces imposed thereon by the pawl to further decrease the loads needed by the operator to engage and disengage the park mechanism. The axis of the control shaft for the face cam is transverse to the transmission housing thereby permitting the operator control lever to be positioned on either side of the transmission housing. Thus, the transmission is readily useful in both righthand and lefthand steer operated vehicles.

It is an object of this invention to provide an improved parking mechanism for a power transmission, wherein an axial face cam is disposed on an axis substantially perpendicular to the axis on which the park pawl is mounted.

It is another object of this invention to provide an improved mechanism in a power transmission, wherein the park pawl, output gear and output shaft are mounted on an axis parallel with the longitudinal axis of the transmission and an operator controlled axial face cam is mounted on an axis parallel with the transverse axis of the transmission.

DESCRIPTION OF AN EXEMPLARY EMBODIMENT

Figure 1:
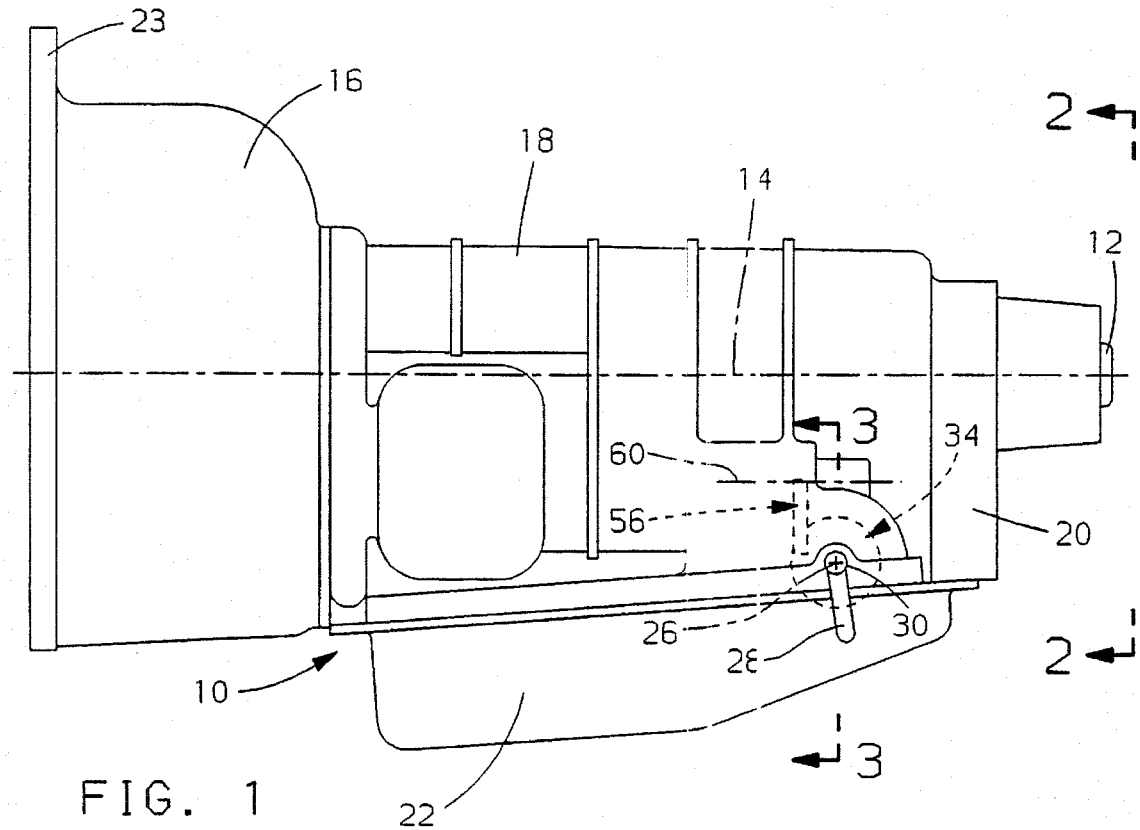
FIG. 1 is a side view of a transmission.

Referring to the drawings, wherein like characters represent the same or corresponding parts throughout the several views, there is seen a transmission, generally designated 10, having an output shaft 12 mounted in parallel relationship with a longitudinal axis 14 of the transmission 10. The transmission 10 can be either a single axis planetary gear type transmission or a multiple axis countershaft type automatic shifting transmission, such as that shown in U.S. Pat. No. 5,009,116 issued to Ordo et al. Apr. 23, 1991, and assigned to the assignee of this application.

The transmission 10 has a housing incorporating a torque converter or bell housing 16, a gear housing 18 and an output or end cover 20. A reservoir or bottom pan 22 is secured to the gear housing 18 by fasteners, not shown, to provide a reservoir for fluid used within the transmission for engaging the various friction devices in a well known manner. The converter housing 16 has a flange 23 adapted to mate with a conventional internal combustion engine, not shown. The output shaft 12 extends through the end cover 20 in a longitudinal direction of the transmission 10 and is adapted to drive the vehicle wheels, not shown.

The transmission 10 also has a transverse axis 24 which intersects the longitudinal axis on which the output shaft 12 is supported. Substantially parallel with the transverse axis 24 is a control axis 26 on which an operator controlled park lever 28 is rotatably supported by a control shaft 30.

Figure 3:
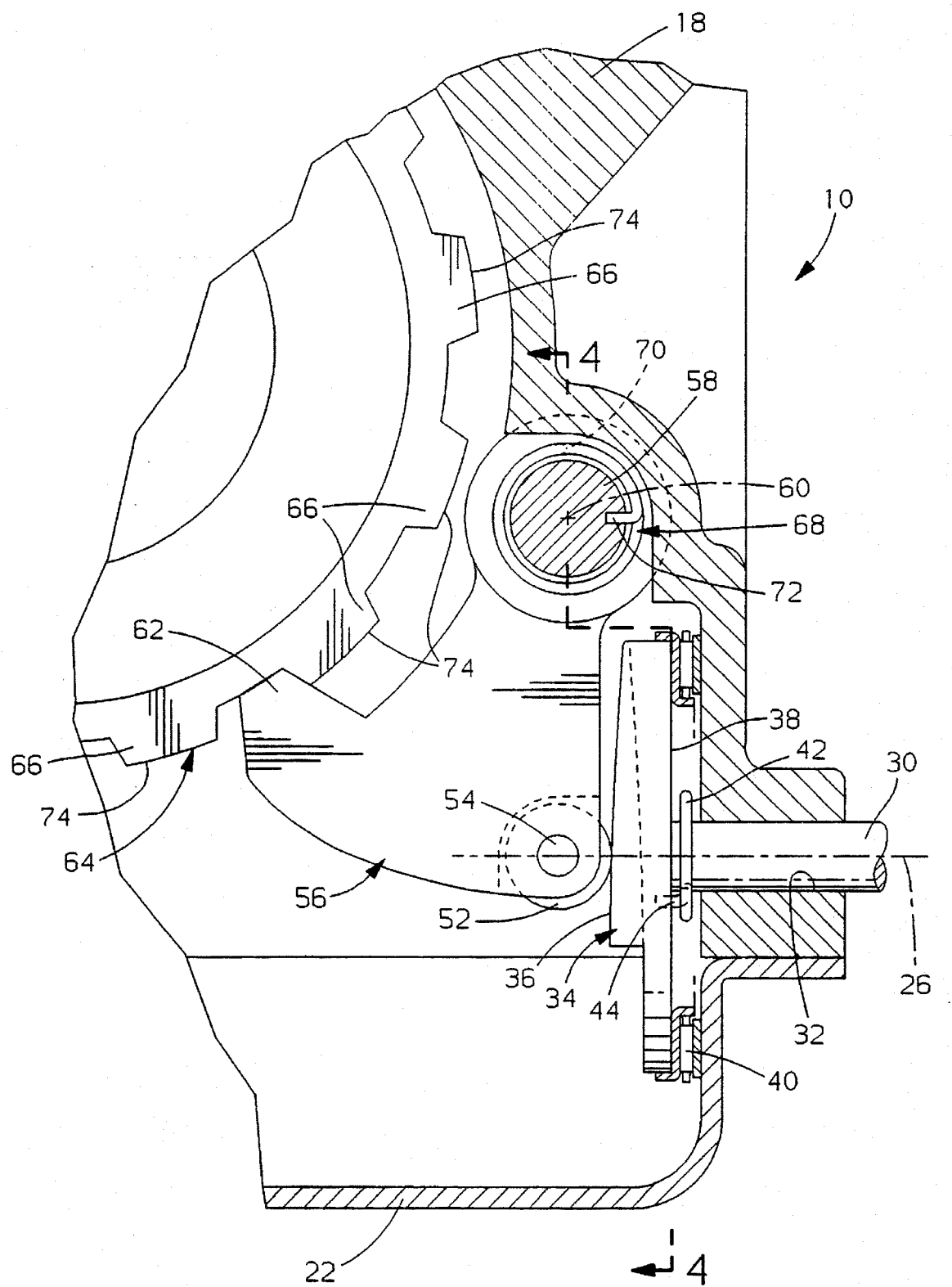
FIG. 3 is an enlarged view taken along line 3—3 in FIG. 1.
Figure 4:
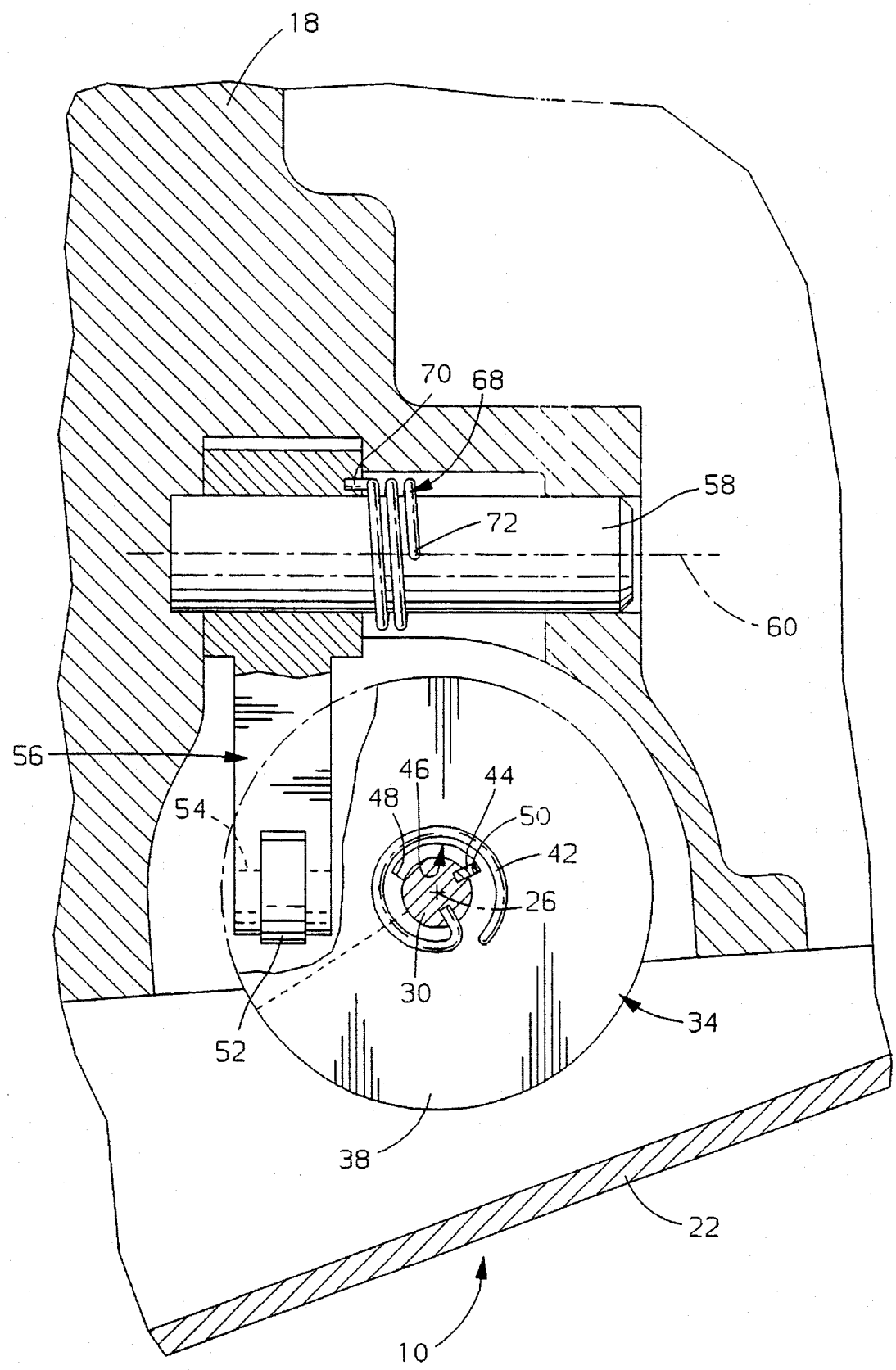
FIG. 4 is a view taken along line 4—4 in FIG. 3.

As best seen in FIG. 3, the control shaft 30 is rotatably supported in an opening 32 formed in the housing 18. One or more seals may be incorporated in the housing 18 to prevent leakage of fluid along the shaft 30 to the atmosphere. The shaft 30 has secured thereto a rotary cam 34 which has formed thereon an axial face cam surface 36. Cam 34 has a support surface 38 which is supported against a thrust support bearing 40 which, in turn, abuts the housing 18. Thus, the axial loads applied to the face cam 36 are taken through the bearing 40 to the housing 18.

The cam 34 is rotatably supported on the control shaft 30, such that the cam 34 is free to rotate relative to the shaft 30. To limit or inhibit the rotation of the cam 34 relative to the shaft 30, a torsion spring 42 is provided which establishes a resilient drive connection between the cam 34 and the shaft 30. The purpose of this resilient drive connection will become apparent later.

The shaft 30 has secured therewith a key 44 which is disposed in a slot 46 formed in the cam 34. The key 44, when engaged with either edge 48 or 50 of the slot 46, will provide a positive drive connection between the cam 34 and the control shaft 30.

The face cam 36 is abutted by a cam follower or roller 52 which is rotatably supported on a pin 54 in a park pawl 56. The park pawl 56, in turn, is rotatably mounted on a shaft 58 supported on a pawl axis 60 which is disposed parallel with the longitudinal axis 14 of the transmission. The park pawl 56 has a tooth portion 62 which is adapted to engage a park gear 64 which is rotatable with the output shaft 12. The tooth 62 will engage between teeth 66 of the park gear 64 to prevent rotation of the output shaft 12 whenever the lever 28 is manipulated by the operator to the "Park" position. When the lever 28 is not in the "Park" position, the pawl 56 is urged out of engagement with the park gear 64 by separating forces on the teeth 62, 66, and by a spring 68, which is grounded to the housing 18 through fixed shaft 58 at an end 72, and secured to the pawl 56 by an end 70.

As the control shaft 30 and cam 34 are rotated by the operator through manipulation of the lever 28, the face cam or cam surface 36 moves linear relative to the roller 52. The face cam 36 also enforces pivoting or oscillating motion of the park pawl 56 about its axis 60 which urges the park pawl 56 toward the park gear 64.

Should the tooth 62 engage an outer surface 74 of the tooth 66, the pawl 56 will cease to pivot about the axis 60.

However, the cam 34 will continue to be urged in a rotary direction by the control shaft 30. The spring 42 will, in this instance, permit relative rotation between the control shaft 30 and the cam 34, such that the cam will remain stationary relative to the park pawl 56 and the follower 52, while the shaft 30 continues to rotate thereby storing energy in the torsion spring 42.

Should the output shaft 12 rotate slightly, such that the tooth 62 can be aligned between adjacent teeth 66, the stored energy in torsion spring 42 will enforce rotary motion of the cam 34, thereby completing engagement of the park pawl 56 with the park gear 64.

The tooth shape on the tooth 62 and the shape on the teeth 66 is designed, such that a loading imposed therebetween is in a direction to urge disengagement of the pawl 56 from to the park gear 64. Therefore, when the operator manipulates the lever 28 out of the "Park" position, and the cam 34 is rotated to permit pivoting of the park pawl 56 in a counterclockwise direction as viewed in FIG. 3, the loading between the teeth 66 and 62 will enforce counterclockwise pivoting of the pawl 56. Pivoting in this direction is also assisted by the spring 68 which, as previously mentioned, is connected between the shaft 58 and the pawl 56. If for some reason the cam 34 does not immediately rotate as a result of the force in spring 42, the key 44 will abut the end wall 48 and add to the forces rotating the cam 34 about the control axis 26.

Figure 2:
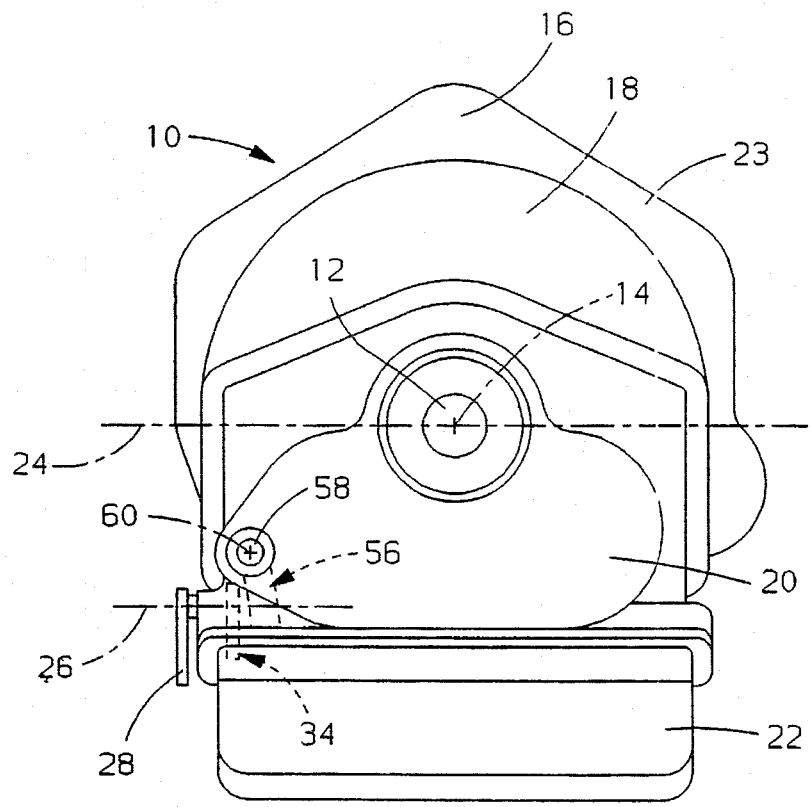
FIG. 2 is a view taken along line 2—2 in FIG. 1.

As can be readily appreciated from viewing FIG. 2, the control shaft 30 can be introduced from either the lefthand side or the righthand side of the transmission when viewed from the rear as shown in FIG. 2. Thus, the operator's control levers can be disposed on either side of the transmission, such as the operator's position can be disposed on either side of the transmission. Presuming the longitudinal axis of the transmission is substantially aligned with or parallel to the longitudinal axis of the vehicle, which is the usual case in front engine rear drive transmissions, either a righthand or lefthand drive vehicle can incorporate a parking mechanism utilizing the present invention without significant changes in any of the other transmission components. This, of course, provides for easier manufacture and a reduction in the amount of inventory necessary in a plant producing both types of transmissions.

The cam 34 and the thrust support bearing 40 distribute the substantial forces imposed on the park mechanism of hauling vehicles having a high GVW. This system also permits the operator to utilize low input forces to control the parking mechanism with the offset of the follower 52 relative to the center of rotation of the cam 34.

Obviously, many modifications and variations of the present invention are possible in light of the above teaching. It is therefore to be understood, that within the scope of the appended claims, the invention may be practiced otherwise than as specifically described.

The embodiments of the invention in which an exclusive property or privilege is claimed are defined as follows:

1. A park lock mechanism for a power transmission comprising:

a transmission output shaft having an axis;

a gear member continuously rotatable with the output shaft;

a pawl;

means for mounting the pawl on an axis substantially parallel with the axis of the gear member;

a cam having an axial face engaging a portion of the pawl;

control means for mounting and for rotating the cam to enforce pivoting of the pawl for controlled engagement of the pawl with the gear member, said control means comprising an operator rotatable control shaft having a longitudinal axis disposed in a plane orthogonal to a plane containing the axis of the output shaft, and a spring drivingly connected between the control shaft and the cam for transmitting torque from the shaft to the cam and for providing lost motion means for permitting relative rotary movement between the cam and the control shaft during engagement of the pawl and gear member if the pawl abuts an outer tooth surface of the gear member.

2. A park lock mechanism for a power transmission comprising:

a housing;

a transmission output shaft having an axis disposed longitudinally of the housing;

a gear member continuously rotatable with the output shaft;

a pawl;

means for mounting the pawl on an axis substantially parallel with the axis of the gear member;

a cam having an axial face engaging a portion of the pawl;

control means for mounting and for rotating the cam to enforce pivoting of the pawl for controlled engagement of the pawl with the gear member, said control means comprising a rotatable control shaft having a longitudinal axis disposed transversely of the housing in a plane orthogonal to a plane containing the axis of the output shaft, and lost motion spring drive means for providing a resilient force transmitter between the control shaft and the cam and for permitting relative rotary movement between the cam and the control shaft if the pawl member abuts an outer surface of the gear member during the pivoting of the pawl for engagement with the gear member.

* * * * *